(12) United States Patent
van Diggelen (10) Patent No.: US 7,987,048 B2
(45) Date of Patent: Jul. 26, 2011

(54) METHOD AND APPARATUS FOR COMPUTING POSITION USING INSTANTANEOUS DOPPLER MEASUREMENTS FROM SATELLITES

(75) Inventor: Frank van Diggelen, San Jose, CA (US)

(73) Assignee: Broadcom Corporation, Irvine, CA (US)

(*) Notice: Subject to any disclaimer, the term of this patent is extended or adjusted under 35 U.S.C. 154(b) by 1618 days.

(21) Appl. No.: 11/311,842

(22) Filed: Dec. 19, 2005

(65) Prior Publication Data
US 2006/0111840 A1 May 25, 2006

Related U.S. Application Data

(63) Continuation-in-part of application No. 10/617,559, filed on Jul. 11, 2003, now Pat. No. 7,133,772.

(60) Provisional application No. 60/399,647, filed on Jul. 30, 2002.

(51) Int. Cl.
G01S 19/42 (2010.01)
G01C 21/00 (2006.01)

(52) U.S. Cl. .................. 701/213; 701/214; 342/357.25

(58) Field of Classification Search ............. 342/357.03, 342/357.01, 357.02, 357.05, 357.06, 357.09, 342/357.12, 357.21, 357.22, 357.25, 357.26; 701/213, 214, 215
See application file for complete search history.

(56) References Cited

U.S. PATENT DOCUMENTS

| 4,797,677 | A | * | 1/1989 | MacDoran et al. ........... 342/352 |
| 5,552,794 | A | * | 9/1996 | Colley et al. ............. 342/357.05 |
| 5,663,734 | A |   | 9/1997 | Krasner |
| 6,181,275 | B1 |  | 1/2001 | Chenebault et al. |
| 6,411,892 | B1 |  | 6/2002 | van Diggelen |
| 6,417,801 | B1 |  | 7/2002 | van Diggelen |
| 6,560,536 | B1 | * | 5/2003 | Sullivan et al. ............... 701/214 |
| 6,597,311 | B2 |  | 7/2003 | Sheynblat et al. |
| 6,650,282 | B2 |  | 11/2003 | Martikka |
| 6,718,174 | B2 |  | 4/2004 | Vayanos |

(Continued)

FOREIGN PATENT DOCUMENTS

WO WO-9802762 A2 1/1998

(Continued)

OTHER PUBLICATIONS

International Search Report dated Dec. 2, 2003 for PCT Application No. PCT/US03/23672.

(Continued)

*Primary Examiner* — Thomas G Black
*Assistant Examiner* — Christine Behncke
(74) *Attorney, Agent, or Firm* — McAndrews, Held & Malloy, Ltd.

(57) ABSTRACT

Method and apparatus for computing position using instantaneous Doppler measurements from satellites is described. In one example, instantaneous Doppler measurements are measured for a plurality of satellite signals relative to a satellite signal receiver. The instantaneous Doppler measurements are transmitted to a server. Position of the satellite signal receiver is computed at the server using the instantaneous Doppler measurements. In another example, at least one fractional pseudorange is measured between the satellite signal receiver and a respective at least one satellite. At least one instantaneous Doppler measurement is measured for a respective at least one satellite signal relative to the satellite signal receiver. The at least one pseudorange and the at least one instantaneous Doppler measurement are sent to a server. Position of the satellite signal receiver is computed at the server using the at least one pseudorange and the at least one instantaneous Doppler measurement.

20 Claims, 6 Drawing Sheets

U.S. PATENT DOCUMENTS

| | | |
|---|---|---|
| 6,724,807 B1 | 4/2004 | Krasner et al. |
| 7,183,971 B1 * | 2/2007 | Lloyd et al. .............. 342/357.09 |
| 7,333,053 B2 * | 2/2008 | Lawrence et al. ........ 342/357.04 |
| 2002/0093452 A1 | 7/2002 | Hirata et al. |
| 2002/0111739 A1 | 8/2002 | Jandrell |
| 2003/0132879 A1 | 7/2003 | Dooley et al. |
| 2003/0156058 A1 * | 8/2003 | Edwards et al. ......... 342/357.04 |
| 2004/0203865 A1 | 10/2004 | Krasner |
| 2005/0212700 A1 * | 9/2005 | Diggelen et al. ......... 342/357.06 |

FOREIGN PATENT DOCUMENTS

WO  WO-2004011957 A1  2/2004

OTHER PUBLICATIONS

Djuknic, G. M., et al., "Geolocation and Assisted GPS", *IEEE*, vol. 34 (2), (Feb. 2001),123-125.

\* cited by examiner

METHOD AND APPARATUS FOR COMPUTING POSITION USING INSTANTANEOUS DOPPLER MEASUREMENTS FROM SATELLITES

CROSS-REFERENCE TO RELATED APPLICATIONS

This application is a continuation-in-part of co-pending U.S. patent application Ser. No. 10/617,559, filed Jul. 11, 2003 now U.S. Pat. No. 7,133,722, which claims benefit of U.S. provisional patent application Ser. No. 60/399,647, filed Jul. 30, 2002, each of which is incorporated by reference herein in their entireties.

BACKGROUND OF THE INVENTION

1. Field of the Invention

The present invention relates to satellite positioning systems and, more particularly, to a method and apparatus for a method and apparatus for computing position using instantaneous Doppler measurements from satellites.

2. Description of the Background Art

Satellite Positioning System (SPS) receivers use measurements from several satellites to compute position. SPS receivers normally determine their position by computing time delays between transmission and reception of signals transmitted from satellites and received by the receiver on or near the surface of the earth. The time delays multiplied by the speed of light provide the distance from the receiver to each of the satellites that are in view of the receiver. Exemplary satellite positioning systems include the Global Positioning System (GPS), the European GALILEO system, and the Russian GLONASS system.

In GPS, each signal available for commercial use utilizes a direct sequence spreading signal defined by a unique pseudo-random noise (PN) code (referred to as the coarse acquisition (C/A) code) having a 1.023 MHz spread rate. Each PN code bi-phase modulates a 1575.42 MHz carrier signal (referred to as the L1 carrier) and uniquely identifies a particular satellite. The PN code sequence length is 1023 chips, corresponding to a one millisecond time period. One cycle of 1023 chips is called a PN frame or epoch.

GPS receivers determine the time delays between transmission and reception of the signals by comparing time shifts between the received PN code signal sequence and internally generated PN signal sequences. These measured time delays are referred to as "sub-millisecond pseudoranges," since they are known modulo the 1 millisecond PN frame boundaries. If the data bit edges are identified for a particular satellite, then the pseudorange is known modulo the data bit period, for example, 20 ms in the current GPS system. Different satellite navigation systems, and future changes in the GPS system may give different data bit periods. In general, if a pseudorange is known modulo N ms, then we refer to it as a "fractional pseudorange". By resolving the integer number of milliseconds associated with each delay to each satellite, then one has true, unambiguous, pseudoranges; referred to herein as "full pseudoranges" A set of four full pseudoranges together with knowledge of absolute times of transmission of the GPS signals and satellite positions in relation to these absolute times is sufficient to solve for the position of the GPS receiver. The absolute times of transmission (or reception) are needed in order to determine the positions of the GPS satellites at the times of transmission and hence to compute the position of the GPS receiver.

Accordingly, each of the GPS satellites broadcasts a model of satellite orbit and clock data known as the satellite navigation message. The satellite navigation message is a 50 bit-per-second (bps) data stream that is modulo-2 added to the PN code with bit boundaries aligned with the beginning of a PN frame. There are exactly 20 PN frames per data bit period (20 milliseconds). The satellite navigation message includes satellite-positioning data, known as "ephemeris" data, which identifies the satellites and their orbits, as well as absolute time information (also referred to herein as "GPS system time") associated with the satellite signal. The GPS system time information is in the form of a second of the week signal, referred to as time-of-week (TOW). This absolute time signal allows the receiver to unambiguously determine a time tag for when each received signal was transmitted by each satellite.

GPS satellites move at approximately 3.9 km/s, and thus the range of the satellite, observed from the earth, changes at a rate of at most ±800 m/s. Absolute timing errors result in range errors of up to 0.8 m for each millisecond of timing error. These range errors produce a similarly sized error in the GPS receiver position. Hence, absolute time accuracy of 10 ms is sufficient for position accuracy of approximately 10 m. Absolute timing errors of much more than 10 ms will result in large position errors, and so typical GPS receivers have required absolute time to approximately 10 milliseconds accuracy or better.

Another time parameter closely associated with GPS positioning is the sub-millisecond offset in the time reference used to measure the sub-millisecond pseudorange. This offset affects all the measurements equally, and for this reason it is known as the "common mode error". The common mode error should not be confused with the absolute time error. As discussed above, an absolute time error of 1 millisecond leads to range errors of up to 0.8 meters while an absolute time error of 1 microsecond would cause an almost unobservable range error of less than 1 millimeter. A common mode error of 1 microsecond, however, results in a pseudorange error of 1 microsecond multiplied by the speed of light (i.e., 300 meters). Common mode errors have a large effect on pseudorange computations, and it is, in practice, very difficult to calibrate the common mode error. As such, traditional GPS receivers treat the common mode error as an unknown that must be solved for, along with position, once a sufficient number of pseudoranges have been measured at a particular receiver.

If a GPS receiver has the correct absolute time, then, to date, one of the following conditions has been necessary to compute a first position fix: a) three full pseudoranges; or b) three factional pseudoranges plus known approximate position (to within 300 km). If there is no a-priori knowledge of altitude, then the necessary minimum number of pseudoranges becomes four.

In some GPS applications, the signal strengths of the satellite signals are so low that either the signals cannot be processed, or the time required to process the signals is excessive. For example, a GPS receiver may be operated in an urban canyon, where buildings or other obstructions block the line-of-sight of all but two or three satellites. In such an environment, conventional GPS receivers may not be able to uniquely determine a first position fix. Even with adequate line-of-sight view to the satellites, it may take several seconds to decode the TOW data from the satellite, which is required to get full pseudoranges in the absence of a known initial position.

Accordingly, there exists a need in the art for a method and apparatus that uniquely determines a first position fix of a GPS receiver without requiring full pseudoranges, or known initial position.

SUMMARY OF THE INVENTION

Method and apparatus for computing position using instantaneous Doppler measurements from satellites is described. In one embodiment, instantaneous Doppler measurements are measured for a plurality of satellite signals relative to a satellite signal receiver. The instantaneous Doppler measurements are transmitted to a server. Position of the satellite signal receiver is computed at the server using the instantaneous Doppler measurements. In another embodiment, at least one fractional pseudorange is measured between the satellite signal receiver and a respective at least one satellite. At least one instantaneous Doppler measurement is measured, for a respective at least one satellite signal relative to the satellite signal receiver. The at least one pseudorange and the at least one instantaneous Doppler measurement are sent to a server. Position of the satellite signal receiver is computed at the server using the at least one pseudorange and the at least one instantaneous Doppler measurement. Note that Doppler measurements may be made by directly observing the frequency of the received signal (for example, with a frequency-locked-loop); or by indirectly observing the frequency of the received signal (for example, with a phase-locked-loop); or by observing the change in pseudo-range (for example, by differencing successive pseudo-range measurements). In the last case, the observed quantity is sometimes called a "range-rate". However "range-rate" is a measure of the same physical quantity as a Doppler measurement, and for simplicity both range rate and Doppler measurement are referred to by the term 'Doppler measurement'.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE INVENTION

A method and apparatus for navigation using instantaneous range-rate or Doppler measurements from satellites is described. Those skilled in the art will appreciate that the invention may be used with various types of mobile or wireless devices that are "location-enabled," such as cellular telephones, pagers, laptop computers, personal digital assistants (PDAs), and like type wireless devices known in the art. Generally, a location-enabled mobile device is facilitated by including in the device the capability of processing satellite positioning system (SPS) satellite signals.

In the various embodiments of the invention described herein, Doppler measurements can be substituted for instantaneous range rate measurements. Both the instantaneous range rate and Doppler regarding a satellite provide an indication of the relative motion of the satellite and clocks. As such, the terms range rate and Doppler can be used interchangeably.

Figure 1:
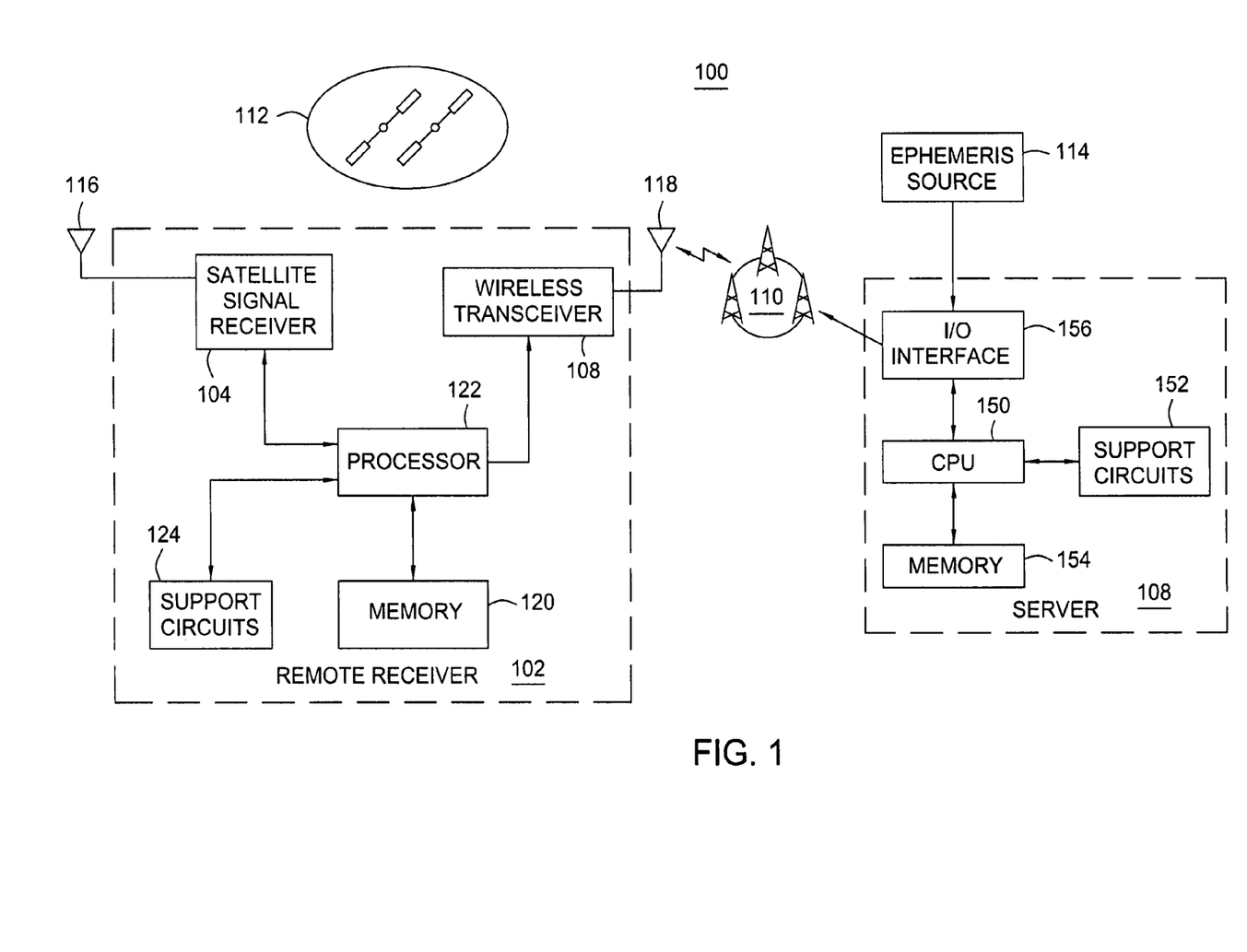
FIG. 1 is a block diagram depicting an exemplary embodiment of a position location system.

FIG. 1 is a block diagram depicting an exemplary embodiment of a position location system 100. The system 100 comprises a remote receiver 102 and a server 108. The remote receiver 102 is configured to receive satellite signals from a plurality of satellites 112 in a constellation of satellites. The remote receiver 102 processes the received signals to produce satellite measurement data (e.g., pseudoranges, Doppler measurements) with respect to the satellites 112. In one embodiment, the remote receiver 102 receives acquisition assistance data from the server 108. The remote receiver 102 may communicate with the server 108 via a wireless network 110. The wireless network 110 may comprise any type of wireless network known in the art, such as a cellular telephone network.

The remote receiver 102 may use the acquisition assistance data to aid in acquisition of the satellite signals. The assistance data may include expected code phase (expected pseudoranges), expected Doppler, a pseudorange model, and like type acquisition assistance data known in the art, as well as any combination of such data. In another embodiment, the remote receiver 102 may perform a blind search process to detect the satellite signals without receiving or using acquisition assistance data from the server 108. In either case, the remote receiver 102 sends the satellite measurement data to the server 108 and the server 108 computes position of the remote receiver.

Notably, the remote receiver 102 may receive signals from fewer than four satellites. Conventionally, a unique initial position (a "first fix") cannot be determined using only two satellites. Even if a third satellite were visible, a conventional GPS receiver would not be able to determine an initial position fix without some a-priori knowledge of position or altitude.

As described in more detail below, the remote receiver 102 of the invention measures Doppler shift in signals transmitted by the satellites in view ("Doppler measurements"), as well as fractional pseudoranges, and transmits such information to the server 108 to obtain a first fix for position. As such, the system 100 is capable of determining an initial position based on signals received from fewer than four satellites, without a-priori knowledge of approximate position, or altitude. For example, the system 100 may obtain a first fix for position using pseudoranges and Doppler measurements to only two satellites. Thus, the invention may advantageously operate in an urban environment, for example, where objects obstruct the view to most satellites. Moreover, the invention may operate using signals from only two or three satellites without receiving a-priori knowledge of approximate position.

Position computation using Doppler measurements from satellites is a well-known technique when done over a period of time in which the satellites move over a significant part of the sky. The first satellite navigation system, known as "Transit", used a technique of measuring a change in Doppler shift over a period of several minutes, as the satellite rose, passed through the visible sky, and then set. A similar technique may be used with GPS satellites, since they too move through the sky. However, such a technique would result in a long time-to-fix (e.g., many minutes, or even hours). In contrast to measuring a change in Doppler shift over a period of several minutes, the invention makes use of instantaneous Doppler measurements (e.g., Doppler measurements made over several milliseconds or, at most, seconds). Instantaneous Doppler measurements do not rely on the change in Doppler related to satellite movement during the observation interval. For simplicity, the term "Doppler measurements" as used in the following description means instantaneous Doppler measurements.

In one embodiment, the remote receiver 102 comprises a satellite signal receiver 104, a wireless transceiver 106, a processor 122, support circuits 124, and a memory 120. The satellite signal receiver 104 receives satellite signals from the satellites 112 using an antenna 116. The satellite signal receiver 104 may comprise a conventional A-GPS receiver. An exemplary A-GPS receiver is described in commonly-assigned U.S. Pat. No. 6,453,237, issued Sep. 17, 2002, which is incorporated by reference herein in its entirety. The wireless transceiver 106 receives wireless signals from the wireless communication network 110 via an antenna 118. The satellite signal receiver 104 and the wireless transceiver 106 are controlled by the processor 122.

The processor 122 may comprise a microprocessor, instruction-set processor (e.g., a microcontroller), or like type processing element known in the art. The processor 122 is coupled to the memory 120 and the support circuits 124. The memory 120 may be random access memory, read only memory, removable storage, hard disc storage, or any combination of such memory devices. Various processes and methods described herein may be implemented via software stored in the memory 120 for execution by the processor 122. Alternatively, such processes and methods may be implemented using dedicated hardware, such as an application specific integrated circuit (ASIC), or a combination of hardware and software. The support circuits 124 include conventional cache, power supplies, clock circuits, data registers, I/O circuitry, and the like to facilitate operation of the remote receiver 102.

Satellite navigation data, such as ephemeris for at least the satellites 112, may be collected by a network of tracking stations ("ephemeris source 114"). The ephemeris source 114 may include several tracking stations that collect satellite navigation data from all the satellites in the constellation, or a few tracking stations, or a single tracking station that only collects satellite navigation data for a particular region of the world. An exemplary system for collecting and distributing ephemeris is described in commonly-assigned U.S. Pat. No. 6,411,892, issued Jun. 25, 2002, which is incorporated by reference herein in its entirety. The reference network 114 may provide the collected satellite navigation data to the server 108.

The server 108 illustratively comprises a central processing unit (CPU) 150, support circuits 152, a memory 154, and an input/output (I/O) interface 156. The support circuits 152 comprise well-known circuits that facilitate operation of the CPU 150, such as clock circuits, cache, power supplies, I/O interface circuits, and the like. The memory 154 may be random access memory, read only memory, removable storage, hard disc storage, or any combination of such memory devices. The I/O interface 156 may be coupled to the wireless communication network 110 for receiving measurements and data from the remote receiver 102, and the ephemeris source 114 for receiving satellite trajectory data.

Figure 2:
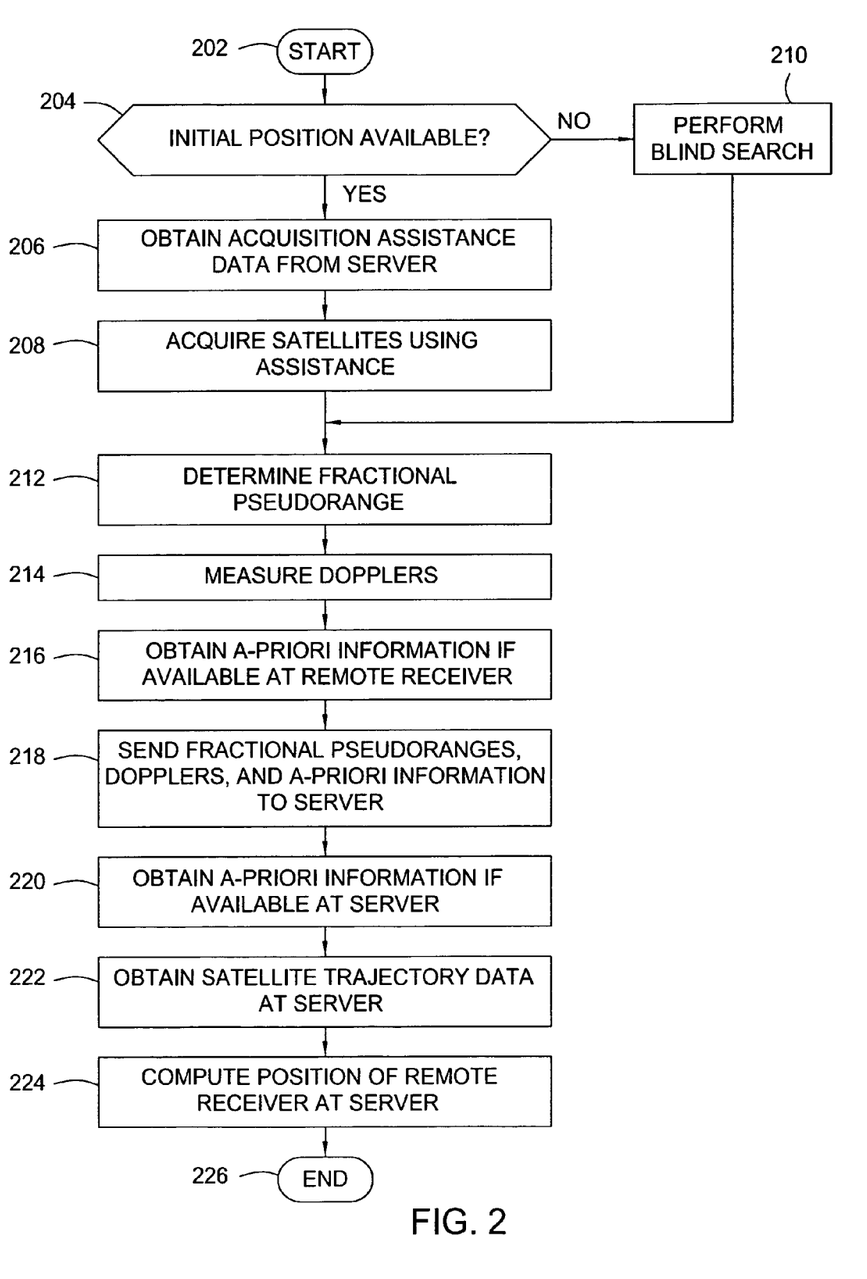
FIG. 2 is a flow diagram depicting an exemplary embodiment of a method for locating position of a remote receiver in accordance with the invention.

FIG. 2 is a flow diagram depicting an exemplary embodiment of a method 200 for locating position of a remote receiver 102 in accordance with the invention. The method 200 begins at step 202. At step 204, a determination is made whether an initial position is available for the remote receiver 102. Notably, an initial or estimated position of the remote receiver 102 may be obtained using various position estimation techniques known in the art, including use of transitions between base stations of the wireless communication network 110, use of a last known location of the remote receiver 102 (e.g., a position cache in either the remote receiver 102 or the server 108), use of a location of a base station in communication with the remote receiver 102, use of a location of the wireless communication network 110 as identified by a network ID, or use of a location of a cell site of the wireless communication network 110 in which the remote receiver 102 is operating as identified by a cell ID. The initial position may be determined using such techniques by either the remote receiver 102 or the server 108.

If an initial position is available, the method 200 proceeds to step 206. At step 206, the remote receiver 102 obtains acquisition assistance data from the server 108. As discussed above, the acquisition assistance data may include expected pseudoranges, pseudorange rates or Doppler, pseudorange models, and the like that are based on the initial position of the remote receiver 102. At step 208, the remote receiver 102 acquires satellite signals using the acquisition assistance data. If an initial position is not available at step 204, the method 200 proceeds to step 210. At step 210, a blind search is performed to detect SPS satellites. That is, the remote receiver 102 searches for satellite signals in a conventional manner without the benefit of acquisition assistance data.

At step 212, fractional pseudoranges are determined to the acquired satellites. In one embodiment, fractional pseudoranges are obtained by measuring sub-millisecond pseudoranges at the remote receiver 102 using a conventional correlation process. In another embodiment, fractional pseudoranges are obtained by synchronizing to the navigation data bit edges (e.g., in GPS, the navigation data bit edges occur every 20 milliseconds). By identifying the navigation data bit edges, the pseudoranges may be determined modulo the navigation data bit period (e.g., modulo 20 milliseconds in GPS to provide sub-20 millisecond pseudoranges). In yet another embodiment, fractional pseudoranges are obtained from sub-ms pseudoranges for some satellites, and modulo the data bit period for other satellites. At step 214, pseudorange rates, or Dopplers, are measured at the remote receiver 102. In one embodiment, the pseudorange rates may be measured by obtaining Doppler measurements. Alternatively, the pseudorange rates may be measured by computing the time-derivative of the fractional pseudoranges.

At step 216, a-priori knowledge of position, time, clock, velocity, or frequency unknowns, or any combination of such unknowns, is obtained if such a-priori knowledge is available at the remote receiver 102. At step 218, the fractional pseudoranges, pseudorange rates or Dopplers, and any a-priori information is sent to the server 108. At step 220, a-priori knowledge of position, time, clock, velocity, or frequency unknowns, or any combination of such unknowns, is obtained at the server 108 if such a-priori knowledge is available and to the extent that such information has not already been obtained by the remote receiver 102. At step 222, the server 108 obtains satellite trajectory data (e.g., ephemeris). At step 224, the server 108 computes position of the remote receiver 102 using the fractional pseudoranges, the pseudorange rates or Dopplers, any a-priori information, and the satellite trajectory data using the navigation models, discussed below. The method 200 ends at step 226.

In the general satellite navigation problem, there are nine unknowns:

Three position unknowns: x, y, z
Three velocity unknowns: $\dot{x}, \dot{y}, \dot{z}$
Three clock unknowns: $t_C, t_S, f_C$ where $t_C$ is the common mode timing error (usually a sub-millisecond value in GPS), $t_S$ is the absolute time tag error, and $f_C$ is the frequency error in a local oscillator within the remote receiver 102. The absolute time tag error ($t_S$) occurs when the handover word (HOW) cannot be decoded from a satellite signal, and accurate time-of-day information is not available from any other source, such as the wireless communication network 110. As used herein, a quantity is "unknown" or "not known accurately" when that the quantity is not known accurately enough for the purpose of computing an accurate position. Thus, any quantity is "unknown" or "not known accurately" if it is required to compute it more accurately before the position can be accurately computed. For example, an "accurate position" may be considered as a position that is known within 10 meters; in this case $t_S$ would be considered unknown if it was not known to within 10 milliseconds, and $t_C$ would be considered unknown if it was not known to within 30 nanoseconds. Those skilled in the art will appreciate, however, that a position may be considered accurate if it is known within more or less than 10 meters, as desired.

Generally, the most critical information to be solved is the unknown horizontal coordinates—x and y—if the coordinate system is defined with x and y in the local horizontal plane. For the purposes of exposition, the coordinate system described herein is defined using the local horizontal plane, although the invention is not limited to such a coordinate system. As described in more detail below, the invention can solve for the initial (first fix) values of x and y with range and Doppler measurements from two or more satellites. Furthermore, if a-priori knowledge is available for the clock unknowns and velocity unknowns, and an approximate position is known, then the invention can solve for the initial (first fix) values of x and y with range and Doppler measurements from one or more satellites.

More specifically, in a first embodiment, a first fix for position of the remote receiver 102 is computed by the server 108 with a single satellite, given a-priori knowledge of the clock and velocity unknowns and a-priori knowledge of approximate position. In this embodiment a full-pseudorange and a Doppler measurement are obtained from the satellite. This embodiment may arise in practice if the remote receiver 102 is integrated within a cell-phone and has access to a wireless communication system. An initial position of the remote receiver 102 may be obtained as discussed above. Precise time and frequency may be obtained from the wireless communication network 110, providing a-priori knowledge of $t_C$, $t_S$, and $f_C$. A-priori knowledge of velocity may be obtained either from an external measurement, or by assuming velocity equals zero (often a good assumption when the remote receiver 102 is being used by a person on foot). Of the nine unknowns (x,y,z, $\dot{x},\dot{y},\dot{z}$, $t_C$, $t_S$, $f_C$), seven can be fixed using the a-priori knowledge, leaving two unknowns, x and y. The server 108 may compute the position of the remote receiver 102, as described geometrically below with respect to FIGS. 3-7.

Figure 3:
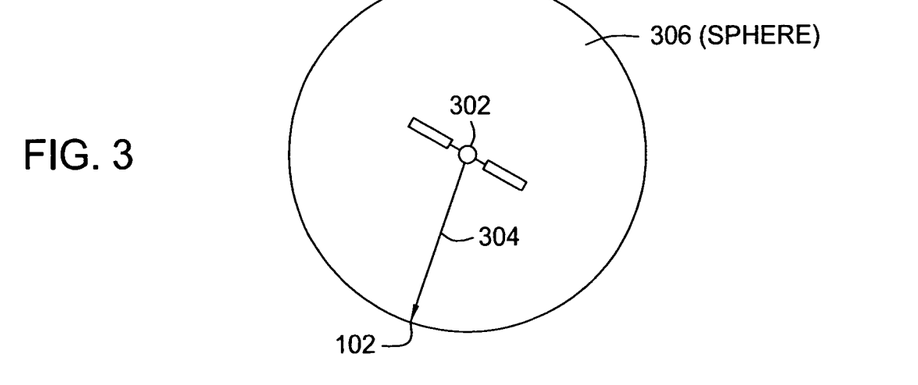
FIG. 3 depicts a geometric solution for position given a range to a satellite.
Figure 4:
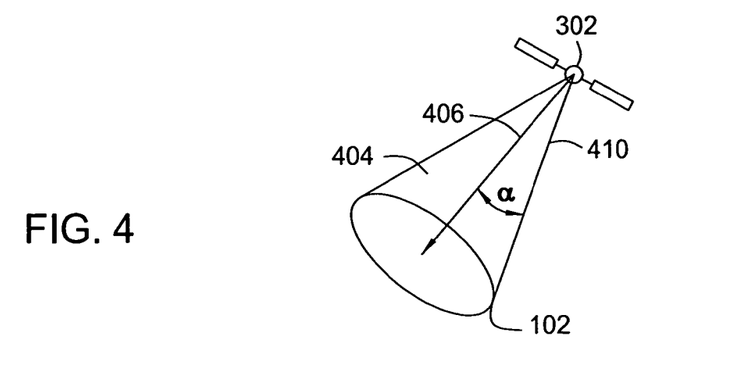
FIG. 4 depicts a geometric solution for position given a measurement of Doppler shift in a signal from a satellite.
Figure 5:
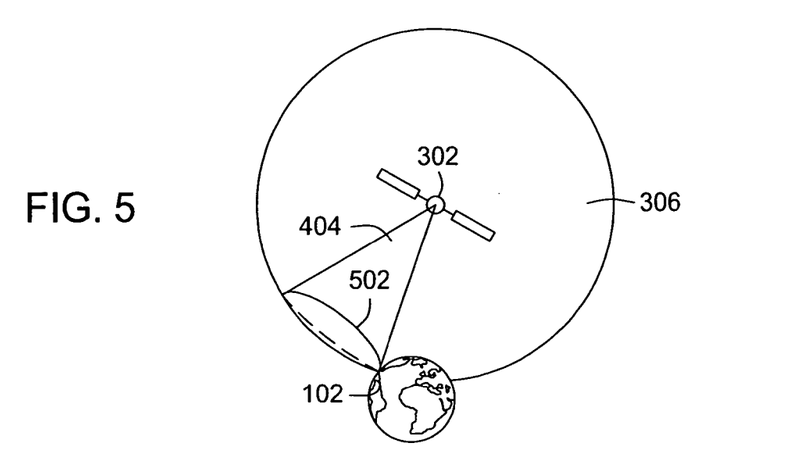
FIG. 5 depicts a circle of position formed by an intersection of the two geometric solutions shown in FIGS. 3 and 4.
Figure 6:
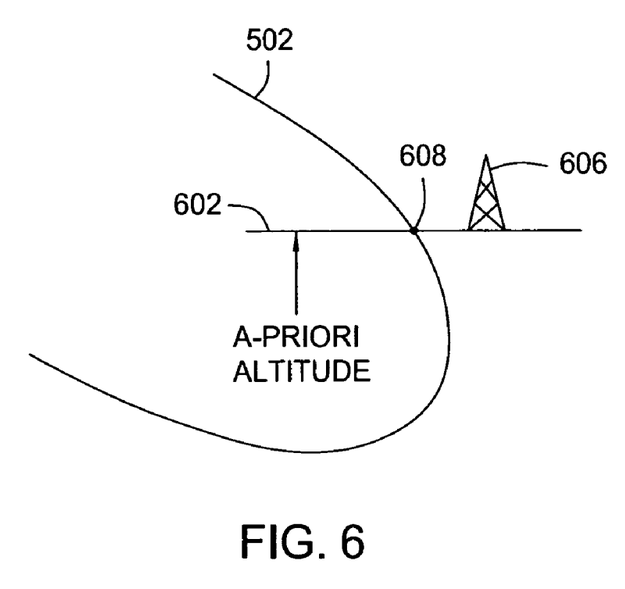
FIG. 6 depicts a unique position solution derived from the intersection of the circle of position of FIG. 5 and an a-priori altitude in a known region.
Figure 7:
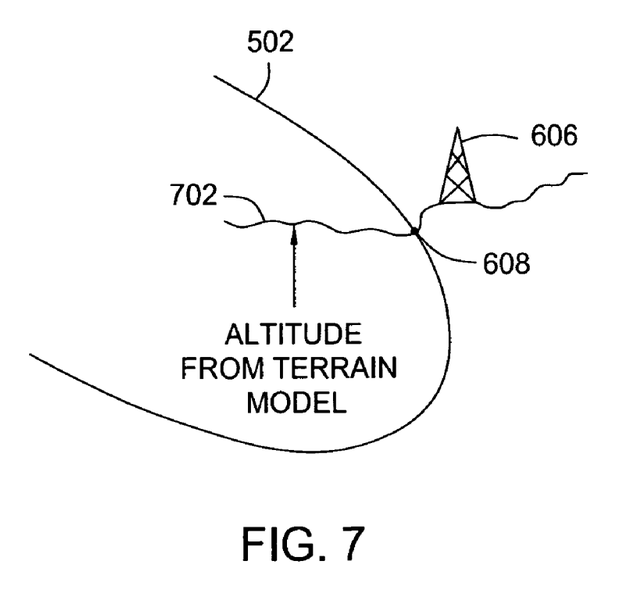
FIG. 7 depicts a unique position solution derived from the intersection of the circle of position of FIG. 5 and a terrain model in a known region.

In particular, FIG. 3 depicts a geometric solution for position given a range to a satellite. FIG. 4 depicts a geometric solution for position given a measurement of Doppler in a signal from a satellite. FIG. 5 depicts a circle of position formed by an intersection of the two geometric solutions shown in FIGS. 3 and 4. FIG. 6 depicts a unique position solution derived from the intersection of the circle of position of FIG. 5 and an a-priori altitude in a known region. FIG. 7 depicts a unique position solution derived from the intersection of the circle of position of FIG. 5 and a terrain model in a known region.

Referring to FIG. 3, with the clock parameters $t_C$ and $t_S$ known, the pseudorange becomes the geometric range by definition. As shown in FIG. 3, for a given satellite 302, the position of the remote receiver 102 is confined to a sphere 306 having a radius 304 equal to the geometric range between the remote receiver 102 and the particular satellite 302.

Referring to FIG. 4, velocity vector 406 for the satellite 302 is computed from the satellite trajectory data (e.g., ephemeris data). If the remote receiver 102 were in line with the velocity vector 406, the Doppler shift present in the satellite signal would be exactly known from the velocity vector 406. Since the remote receiver 102 is not aligned with the trajectory of the satellite 302, the Doppler shift in the satellite signal is related to the angle between the line-of-sight vector from the remote receiver 102 to the satellite 302 and the velocity vector 406. Specifically, the Doppler shift in a given satellite signal is the velocity vector 406 multiplied by the cosine of the angle between the velocity vector and the line-of-sight between the remote receiver 102 and the satellite 302. Given a measurement of the Doppler shift at the remote receiver 102 and the velocity vector 406, the angle between the velocity vector 406 and the line-of-sight can be determined. For the satellite 302, the position of the remote receiver 102 is thus confined to a surface 410 of a cone 404 having a determined angle α equal to the angle between the velocity vector 406 and the line-of-sight between the remote receiver 102 and the satellite 302. Note that the surface 410 of the cone 404 is made up of line-of-sight vectors from each possible location of the remote receiver 102 to the satellite 302.

Referring to FIG. 5, the surface of the sphere 306 is always perpendicular to the line-of-sight vector along the surface 410 of the cone 404. Thus, the surface of position from the Doppler measurement (the cone 404) intersects the surface of position from the range measurement (the sphere 306) at right angles, thereby producing a circle of position 502.

Referring to FIG. 6, in general, the circle of position 502 will coincide with an a-priori altitude, in the vicinity of the a-priori position, at only one point. That is, the circle of position 502 intersects an a-priori altitude 602 in the vicinity of an a-priori position relative to a cell-tower 606 at a point 608. The intersection point 608 is the position of the remote receiver 102. In a more sophisticated implementation, an a-priori altitude is not required, and is replaced by a terrain model, such as shown in FIG. 7. The intersection point 608 is now the intersection of the circle of position 502 and a terrain model 702 in the vicinity of the a-priori position relative to the cell tower 606. Terrain models and their use in GPS position solutions are discussed fully in commonly assigned U.S. Pat. No. 6,429,814, issued Aug. 6, 2002, which is incorporated herein by reference in its entirety.

In a second embodiment, a first fix of position is obtained using two satellites, given a-priori knowledge of approximate position, but no a-priori knowledge of the clock unknowns. In this embodiment, full-pseudoranges and Doppler measurements are obtained from the two satellites. An initial position is obtained as described above. The unknown velocity may be obtained either from an external measurement, or by assuming velocity equals zero. The position of the remote receiver 102 is computed, as described algebraically below.

The absolute time-tag error $(t_S)$ may be obtained either from an external source, such as the wireless communication network 110 if the system is synchronized to GPS time, or by decoding the Handover Word (HOW) from the satellite signals. The altitude parameter (z) may be obtained from the a-priori position information, or by using a terrain model as described above. This leaves four unknowns: x, y, $t_C$ and $f_C$. The four unknowns are related to the Doppler and pseudorange measurements by the following mathematical model:

$$\underline{y} = \begin{bmatrix} u_1 \\ u_2 \\ v_1 \\ v_2 \end{bmatrix} = \begin{bmatrix} \partial \rho_1/\partial x & \partial \rho_1/\partial y & c & 0 \\ \partial \rho_2/\partial x & \partial \rho_2/\partial y & c & 0 \\ \partial \dot{\rho}_1/\partial x & \partial \dot{\rho}_2/\partial y & 0 & c \\ \partial \dot{\rho}_1/\partial x & \partial \dot{\rho}_2/\partial y & 0 & c \end{bmatrix} \begin{bmatrix} x \\ y \\ t_C \\ f_C \end{bmatrix}$$

where: the elements of y are the a-priori pseudorange residuals $u_1$ and $u_2$ for the two satellites, formed by differencing the expected pseudo-ranges (expected for the a-priori position) and the measured pseudo-ranges; and the a-priori Doppler residuals $v_1$ and $v_2$ for the two satellites, formed by differencing the expected Doppler values (expected for the a-priori position and velocity) and the measured Doppler values. The elements in the matrix H are the first order terms of a Taylor expansion relating the residuals to the unknown updates of the a-priori parameters, $\rho_i$ is the pseudorange for satellite i, and $\dot{\rho}_i$ is the Doppler for satellite i. The unknown values x, y, $t_C$ and $f_C$ can now be solved for using standard linear algebra techniques known in the art.

Note that the above exposition shows the Doppler measurements as coming from the same satellites as the pseudorange measurements. However, the current invention is not restricted to using the same satellites for these different kinds of measurements, and the above exposition could equally well be shown with some pseudorange measurements coming from one set of satellites and some Doppler measurements from another set. Similarly, the pseudorange measurements could be taken at a different time from the Doppler measurements, provided the remote receiver 102 does not move by too great an amount in that period of time, or provided that the remote receiver motion is properly modeled over that period of time.

Having solved for the unknown $t_C$ and $f_C$, (by using an assumed value of altitude), one can now hold the values of $t_C$ and $f_C$ fixed, and use the four measurements to solve for x, y, and z for a true three-dimensional position. This process can be iterated to improve the accuracy of all of $t_C$, $f_C$, x, y, and z; including using a terrain model, as described above.

In a third embodiment, a first fix for position is obtained using two satellites, without a-priori knowledge of the clock unknowns and without a-priori knowledge of approximate position. In this embodiment, full-pseudoranges and Doppler measurements are obtained from the two satellites. No a-priori information is obtained by either the remote receiver 102 or the server 108. Thus, an initial position must be estimated. The estimate of initial position may be based on some knowledge of the general region (example, the country, or continent) in which the remote receiver 102 is operating, or may simply be set to the center of the earth. Then, one iteration of the mathematical model described above will produce a position that is a better estimate than the estimated initial position. This result is then used as a better a-priori position, and the process is repeated (using the same measurements, but the new a-priori position). Typically only a few iterations (e.g., fewer than 10) are needed before the result converges to the correct position of the remote receiver 102.

Note that, in some cases, dependent on satellite geometry, two possible solutions may be found in the same general area (e.g., two solutions within the same country). However, this situation can be detected by monitoring the dilution of precision (DOP) associated with the satellite geometry. When DOP is high, then two possible solutions become more likely and a DOP mask may be used to determine whether a computed solution is valid with just two satellites, or whether more satellites are needed.

In a fourth embodiment, a first fix of position is obtained with three satellites, without a-priori knowledge of the clock unknowns and without a-priori knowledge of approximate position. In this embodiment fractional-pseudoranges and Doppler measurements are obtained from the satellites. With three satellites in view, 6 independent pseudorange and Doppler measurements are obtained. Thus, up to 6 unknowns may be solved. When only two satellites were in view, it was necessary to decode the HOW, or to obtain the absolute time-tag error $(t_S)$ from an external source. In this embodiment, the absolute time-tag error $(t_S)$ may be computed by including it as one of the unknowns in the equation relating the unknowns to the measurement residuals in the mathematical model.

In a fifth embodiment, a first fix is obtained with three satellites, without a-priori knowledge of the clock unknowns and without a-priori knowledge of approximate position. In this embodiment only Doppler measurements are obtained from the satellites. With three satellites in view, three independent Doppler measurements are obtained. Thus, up to three unknowns may be solved. At first glance this seems like to few (since there are, in general, nine unknowns (x,y,z, $\dot{x},\dot{y},\dot{z}$, $t_C$, $t_S$, $f_C$). However, as described next (with reference to FIG. 8), the three Doppler measurements can be used to solve for x,y and $f_C$, with a simplifying assumption that altitude, $\dot{x},\dot{y},\dot{z}$ (speed) and $t_S$ are all zero. The common bias unknown, $t_C$, is not relevant in this case, since we have no pseudoranges. The simplifying assumptions leads to some position error, but if the altitude, speed and time-tag error $(t_S)$ are in fact small, then the error will be small. Alternatively, as shown in FIG. 9, the simplifying assumption may be made that $f_C=0$, depending on the oscillator used in the GPS receiver, this may be a better simplifying assumption than holding altitude to zero.

In a sixth embodiment, a first fix is obtained with four satellites, without a-priori knowledge of the clock unknowns and without a-priori knowledge of approximate position. In this embodiment, only Doppler measurements are obtained from the satellites. This case is very similar to the fifth embodiment, but now no assumptions are necessary for altitude, and x,y,z and $f_C$ may be solved for as illustrated in FIGS. 8 and 9, and the accompanying description.

Figure 8:
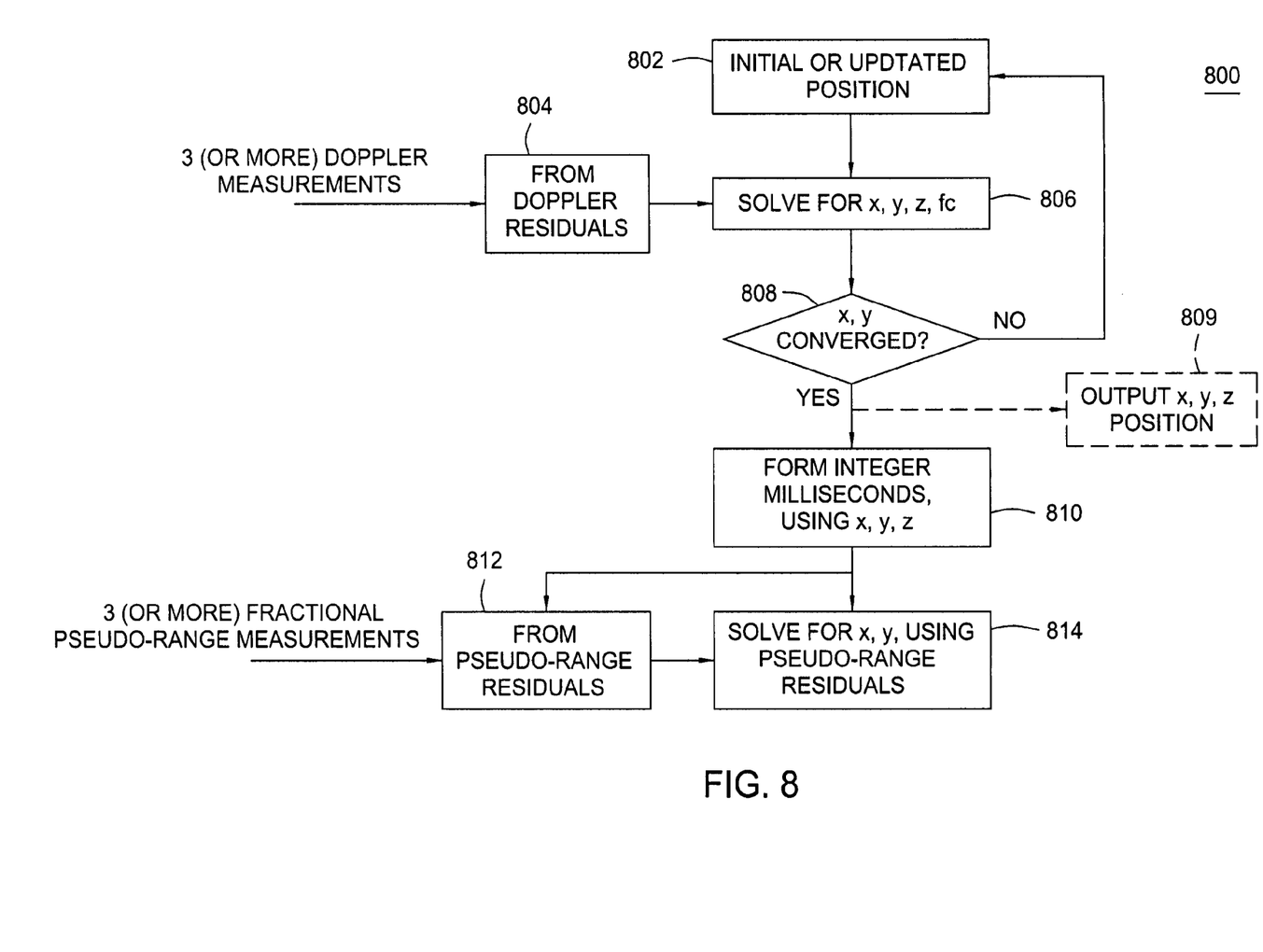
FIG. 8 depicts a flow diagram showing an exemplary embodiment of a method for computing pseudorange integer milliseconds and position using Doppler and fractional pseudorange measurements in accordance with the invention.
Figure 9:
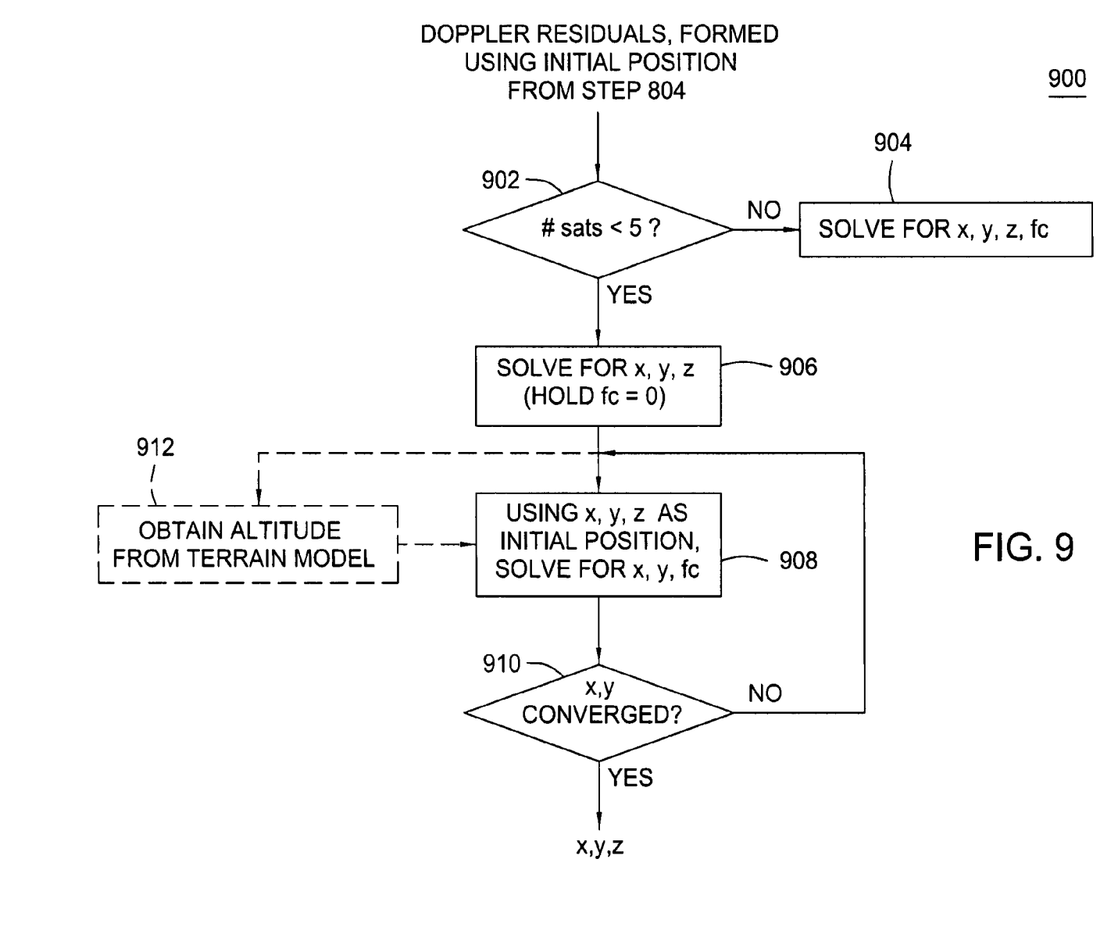
FIG. 9 depicts a flow diagram showing an embodiment of the position computation process of FIG. 8 in accordance with the invention.

FIG. 8 depicts a flow diagram showing an exemplary embodiment of a method 800 for computing pseudorange integer milliseconds and position using Doppler and fractional pseudorange measurements in accordance with the invention. The method 800 may be performed by the server 108. The method 800 begins at step 802, where an initial or updated position is obtained. The initial position may simply be the center of the country or continent in which the remote receiver 102 is operating or, in some cases, an arbitrary guess or the center of the earth. An updated position may be a previously computed position. At step 804, three or more Doppler residuals are formed by subtracting predicted Doppler measurements (predicted using the known satellite ephemeris and the assumed initial position) from the measured Doppler.

At step 806, the Doppler residuals are used to solve for three of the unknowns x, y, and $f_C$. At this stage of the method 800, the unknown values of velocity may be assumed to be zero. This assumption will lead to a reduction in position accuracy. However, if the absolute time-tag error ($t_S$) is not large (e.g., several seconds or less), then the position must only be accurate to within half an epoch (i.e., 146 km) to give the correct pseudorange integers. Speed of 100 km/h in the direction of the satellites will lead to errors in Doppler measurements of less than 146 Hz, which in turn contributes less than 146 km of error to the position. Thus, in almost all circumstances, the speed may safely be assumed to be zero at step 806. The two clock unknowns $t_C$ and $t_S$ may also be ignored at step 806. The unknown altitude, z, may be computed at step 806 by using a terrain model or an assumed altitude may be used.

At each application of the linearized equations in step 806 an improved estimate of x, y is obtained, and so the process naturally converges. At step 808, the values of x and y (position) are evaluated to determine if they have converged. If not, then the computed values for x and y are better estimates, and the method 800 proceeds repeats steps 802 through 806 using the better estimates of x and y until x and y do converge.

At step 810, the computed values of x, y, and z (an approximate position of the GPS device) are used to form integer millisecond values for the pseudorange measurements. U.S. Pat. No. 6,417,801 describes an exemplary process for obtaining integer values of pseudoranges using an approximate position.

At step 812, three or more pseudorange residuals are formed by subtracting the predicted pseudoranges (based on the known satellite ephemeris and computed approximate position x,y,z) from the measured pseudoranges (based on the measured fractional pseudo-ranges and the computed integer milliseconds). At step 814, accurate values of x and y are computed using the pseudorange residuals and a mathematical model as described above. In particular, depending on the number of pseudorange residuals computed, there are three or more independent measurements to solving three or more unknowns. This results in many implementation choices. For example, some unknowns, such as receiver velocity, may be assumed to be zero, or may be computed if enough independent measurements are available. In addition, fewer unknowns may be computed than there are independent measurements, resulting in an overdetermined problem. This is useful for producing a-posteriori residuals, which can be used to check if the previous steps produced correct results (U.S. Pat. No. 6,417,801, for example, shows how to use a-posteriori residuals to check that the correct pseudorange integers were selected).

In the method 800, if the velocity of the GPS device is assumed to be zero, but in fact is not, the method 800 may still be used. However, there may be a decrease in the accuracy of the resultant position solution. With extra measurements, the unknown velocity values need not be assumed, but can be included in the matrix equation, and computed.

FIG. 9 depicts a flow diagram showing an embodiment of the position computation process 806 in accordance with the invention. If there are fewer than five Doppler residuals computed at step 804, than process 806 proceeds from step 902 to step 906. Otherwise, if there are more than five Doppler residuals computed at step 804, then process 806 proceeds from step 902 to step 904, where the values of x, y, z, and $f_c$ are computed directly as described above.

At step 906, the values of x, y, and z are computed while assuming $f_c$ is zero. The values of x, y, and z will be close enough to the position of the remote receiver 102 that the altitude of the GPS device can be fixed. The altitude can be fixed at some nominal value, such as sea level, or a terrain model may be used at step 912. Once the altitude is fixed, the values of x, y, and $f_c$ are computed at step 908. At step 910, the values of x and y are evaluated to determine if they have converged. If not, then the computed values for x and y are better estimates, and the process 806 repeats step 908 using the better estimates of x and y until x and y do converge.

By including the Doppler measurements in the navigation equations, as described throughout this description, one has twice as many independent measurements as with classical GPS (using only pseudorange measurements), and thus there is far more opportunity to use techniques that rely on redundant measurements, such as integer fixing techniques (described, for example in U.S. Pat. No. 6,417,801), and Integrity Monitoring, and Fault Detection techniques that are well known in the art.

The position accuracy derived from Doppler measurements will in general not be as good as the accuracy derived from pseudorange measurements. To take this properly into account, the measurements and the matrix equations must be weighted appropriately, in ways well known in the art. For the United States GPS system (with satellites at approximately 20,000 km altitude), the observed Doppler frequency changes by approximately one Hertz with each kilometer of movement of the observer on the earth. Correspondingly the accuracy of a position derived from instantaneous Doppler measurements will be approximately 1 km per Hertz of measurement error. A typical frequency lock loop can measure Doppler to a tenth of a Hertz, and thus position accuracy will be around 100 meters. By observing carrier phase cycles, Doppler can be measured to better than one-thousandth of a Hertz (for example: by tracking carrier phase coherently for 60 seconds, and measuring the fractional phase to 1 cm precision, Doppler is determined to 1 cm/(60*carrier wavelength)=1/(60*19) Hz<1 milliHertz) this can produce position accuracy better than 1 meter. Better Doppler measurements will lead to yet better accuracy.

The forgoing embodiments have described implementations where both Doppler measurements and pseudorange measurements have been used to compute position. However, those skilled in the art will readily appreciate that the instantaneous Doppler measurements alone may suffice for computing a position. In yet another embodiment, the process 900 may terminate after step 908, yielding an x, y, and z position as an output at step 909. As described above, a position determined using instantaneous Doppler measurements may have accuracy better than 1 meter.

In the preceding discussion, the invention has been described with reference to application upon the United States Global Positioning System (GPS). It should be evident, however, that these methods are equally applicable to similar satellite systems, and in particular, the Russian GLONASS system, the European GALILEO system, combinations of these systems with one another, and combinations of these systems and other satellites providing similar signals, such as the wide area augmentation system (WAAS) and SBAS that provide GPS-like signals. The term "GPS" used herein includes such alternative satellite positioning systems, including the Russian GLONASS system, the European GALILEO system, the WAAS system, and the SBAS system, as well as combinations thereof.

While the foregoing is directed to illustrative embodiments of the present invention, other and further embodiments of the invention may be devised without departing from the basic scope thereof, and the scope thereof is determined by the claims that follow.

What is claimed is:

1. A method of locating position of a satellite signal receiver, comprising:
    measuring at least one fractional pseudorange between the satellite signal receiver and a respective at least one satellite;
    measuring at least one instantaneous Doppler measurement for a respective at least one satellite signal relative to the satellite signal receiver;
    transmitting the at least one pseudorange and the at least one instantaneous Doppler measurement to a server; and
    computing a position of the satellite signal receiver at the server using the at least one pseudorange and the at least one instantaneous Doppler measurement, wherein computing comprises:
        computing an initial position of the satellite signal receiver using the at least one instantaneous Doppler measurement;
        computing an integer millisecond portion of the at least one fractional pseudorange using the initial position to form at least one full pseudorange; forming pseudorange residuals using the at least one full pseudorange and the initial position; and
        computing an update of the initial position.

2. The method of claim 1, wherein the position is a two-dimensional position comprising x and y coordinates in a horizontal plane.

3. The method of claim 1, wherein the computing step comprises:
    estimating an initial position of the satellite signal receiver;
    forming Doppler residuals using the initial position and the at least one instantaneous Doppler measurement;
    forming pseudorange residuals using the initial position and the at least one fractional pseudorange;
    relating the Doppler residuals and the pseudorange residuals to a change in the initial position; and
    computing an update of the initial position.

4. The method of claim 3, wherein the estimating step comprises: obtaining an approximate position of the satellite signal receiver from a wireless communication network.

5. The method of claim 3, wherein the initial position is an arbitrary location.

6. The method of claim 3, wherein the initial position is a center of a country or a continent in which the satellite signal receiver is operating.

7. The method of claim 1, further comprising: computing a frequency error associated with an oscillator of the satellite signal receiver using the at least one instantaneous Doppler measurement and the at least one fractional pseudorange.

8. The method of claim 1, further comprising: computing a time error associated with a clock of the satellite signal receiver using the at least one instantaneous Doppler measurement and the at least one fractional pseudorange.

9. The method of claim 1, wherein the instantaneous Doppler measurements are measured over a time interval that is less than one second.

10. The method of claim 9, wherein measuring at least one instantaneous Doppler measurement for a respective at least one satellite signal relative to the satellite signal receiver further comprises measuring at least one instantaneous for a single satellite signal relative to the satellite signal receiver by measuring the Doppler measurement for only the single satellite signal relative to the satellite signal receiver.

11. A system for locating position, comprising:
    a remote receiver having a satellite signal receiver, a microcontroller, and a wireless transceiver; and a server in wireless communication with the remote receiver;
    where the satellite signal receiver receives satellite signals;
    where the microcontroller determines at least one fractional pseudorange between the satellite signal receiver and at least one satellite and determines at least one instantaneous Doppler measurement for at least one satellite signal of the satellite signals relative to the satellite signal receiver; and
    where the wireless transceiver transmits the at least one fraction pseudorange and the at least one instantaneous Doppler measurement to the server for computing a position of the remote receiver; and
    wherein the instantaneous Doppler measurements are measured over a time interval that is less than one second; and
    wherein measuring at least one instantaneous Doppler measurement for a respective at least one satellite signal relative to the satellite signal receiver further comprises measuring at least one instantaneous for a single satellite signal relative to the satellite signal receiver by measuring the Doppler measurement for only the single satellite signal relative to the satellite signal receiver.

12. The system of claim 11, wherein the server is configured to estimate an initial position of the satellite signal receiver, form Doppler residuals using the initial position and the at least one instantaneous Doppler measurement, form pseudorange residuals using the initial position and the at least one fractional pseudorange, relate the Doppler residuals and the pseudorange residuals to a change in the initial position, and compute an update of the initial position.

13. A method of locating position of a satellite signal receiver, comprising:
    measuring at least one fractional pseudorange between the satellite signal receiver and a respective at least one satellite;
    measuring at least one instantaneous Doppler measurement for a respective at least one satellite signal relative to the satellite signal receiver;
    transmitting the at least one pseudorange and the at least one instantaneous Doppler measurement to a server; and
    computing a position of the satellite signal receiver at the server using the at least one pseudorange and the at least one instantaneous Doppler measurement; and
    wherein the instantaneous Doppler measurements are measured over a time interval that is less than one second; and
    wherein measuring at least one instantaneous Doppler measurement for a respective at least one satellite signal relative to the satellite signal receiver comprises measuring at least one instantaneous for a single satellite signal relative to the satellite signal receiver by measuring the Doppler measurement for only the single satellite signal relative to the satellite signal receiver.

14. The method of claim 13, wherein the position is a two-dimensional position comprising x and y coordinates in a horizontal plane.

15. The method of claim 13, wherein the computing step comprises: estimating an initial position of the satellite signal receiver:
    forming Doppler residuals using the initial position and the at least one instantaneous Doppler measurement;
    forming pseudorange residuals using the initial position and the at least one fractional pseudorange;
    relating the Doppler residuals and the pseudorange residuals to a change in the initial position; and
    computing an update of the initial position.

16. The method of claim 15, wherein the estimating step comprises: obtaining an approximate position of the satellite signal receiver from a wireless communication network.

17. The method of claim 15, wherein the initial position is an arbitrary location.

18. The method of claim 15, wherein the initial position is a center of a country or a continent in which the satellite signal receiver is operating.

19. The method of claim 13, further comprising: computing a frequency error associated with an oscillator of the satellite signal receiver using the at least one instantaneous Doppler measurement and the at least one fractional pseudorange.

20. The method of claim 13, further comprising: computing a time error associated with a clock of the satellite signal receiver using the at least one instantaneous Doppler measurement and the at least one fractional pseudorange.

* * * * *